United States Patent
Whittaker

(10) Patent No.: US 12,272,232 B2
(45) Date of Patent: Apr. 8, 2025

(54) VIBRATION SIGNALING FOR A GUN

(71) Applicant: Airshare, Inc., Ottawa (CA)

(72) Inventor: Richard Jonathan Whittaker, Ottawa (CA)

(73) Assignee: Airshare, Inc., Ottawa (CA)

( * ) Notice: Subject to any disclaimer, the term of this patent is extended or adjusted under 35 U.S.C. 154(b) by 0 days.

(21) Appl. No.: 18/777,082

(22) Filed: Jul. 18, 2024

(65) Prior Publication Data

US 2024/0371242 A1 Nov. 7, 2024

Related U.S. Application Data

(63) Continuation of application No. 18/702,657, filed as application No. PCT/CA2022/051549 on Oct. 20, 2022.

(60) Provisional application No. 63/270,298, filed on Oct. 21, 2021.

(51) Int. Cl.
*G08B 6/00* (2006.01)
*F41G 3/14* (2006.01)
*G06F 3/01* (2006.01)

(52) U.S. Cl.
CPC ............. *G08B 6/00* (2013.01); *F41G 3/14* (2013.01); *G06F 3/014* (2013.01); *G06F 3/016* (2013.01)

(58) Field of Classification Search
CPC ... G08B 6/00; F41G 3/14; G06F 3/014; G06F 3/016
See application file for complete search history.

(56) References Cited

U.S. PATENT DOCUMENTS

| 9,152,231 | B2 * | 10/2015 | Chappaz | H10N 30/082 |
| 2015/0103024 | A1 * | 4/2015 | Haga | G06F 3/0448 |
| | | | | 345/173 |
| 2017/0011602 | A1 * | 1/2017 | Brav | H04W 4/80 |
| 2017/0097216 | A1 * | 4/2017 | Sullivan | F42B 10/00 |

(Continued)

FOREIGN PATENT DOCUMENTS

| CN | 110383215 A * | 10/2019 | G06F 3/016 |
| EP | 919783 A1 * | 6/1999 | F42C 17/04 |
| WO | 2020/128454 | 6/2020 | |

OTHER PUBLICATIONS

PCT/CA2022/051549 Search Report Jan. 5, 2023.
PCT/CA2022/051549 Written Opinion Jan. 5, 2023.

*Primary Examiner* — Quan Zhen Wang
*Assistant Examiner* — Mancil Littlejohn, Jr.
(74) *Attorney, Agent, or Firm* — Teitelbaum & Bouevitch; Neil Teitelbaum

(57) ABSTRACT

An apparatus and an associated method for programming a munition loaded in a gun has a body configured for being mechanically coupled to the gun and for being in a haptic contact with a user of the gun. One or more haptic actuators are mechanically coupled to the body for generating vibrations to provide a haptic signal to the user holding the gun. A haptic controller causes the one or more haptic actuators to modulate the vibrations with a munition programming signal comprising munition programming information for the smart munition. The apparatus having a plurality of haptic actuators may be configured to generate, in communication with an external controller, vibration signals haptically indicating to the user holding the gun a direction to a target.

12 Claims, 10 Drawing Sheets

(56) References Cited

U.S. PATENT DOCUMENTS

2019/0235630 A1\* 8/2019 Verbeke ................ G06F 9/3004
2021/0156648 A1\* 5/2021 Aw ............................ F41G 3/06

\* cited by examiner

VIBRATION SIGNALING FOR A GUN

RELATED APPLICATION DATA

This application is a continuation of U.S. application Ser. No. 18/702,657 filed Apr. 18, 2024, which is the national stage entry of International Appl. No. PCT/CA2022/051549, filed Oct. 20, 2022, which claims priority to U.S. provisional Application No. 63/270,298 filed Oct. 21, 2021. All claims of priority to that application are hereby made, and that application is hereby incorporated in its entirety by reference.

TECHNICAL FIELD

Embodiments described herein relate generally to systems and methods for operating a gun, and more specifically relate to gun operation using vibration signaling.

BACKGROUND

The growing need to increase accuracy, reduce collateral effects, and improve overall mission effectiveness has led to the adoption of "smart" munitions which can be deployed using conventional weapon systems.

Smart munitions contain information about the target or engagement point not normally available to a traditional ballistic munition. This information ranges from simple, such as e.g. time-of-flight, to complex, such as e.g. 3D motion vectors of a plurality of targets. For example, some commercial 40 mm airburst rounds may be programmed with an adjustable time-of-flight parameter in advance of loading, providing the munition with a time to detonate corresponding with a distance when the user aims the launcher at a given angle.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
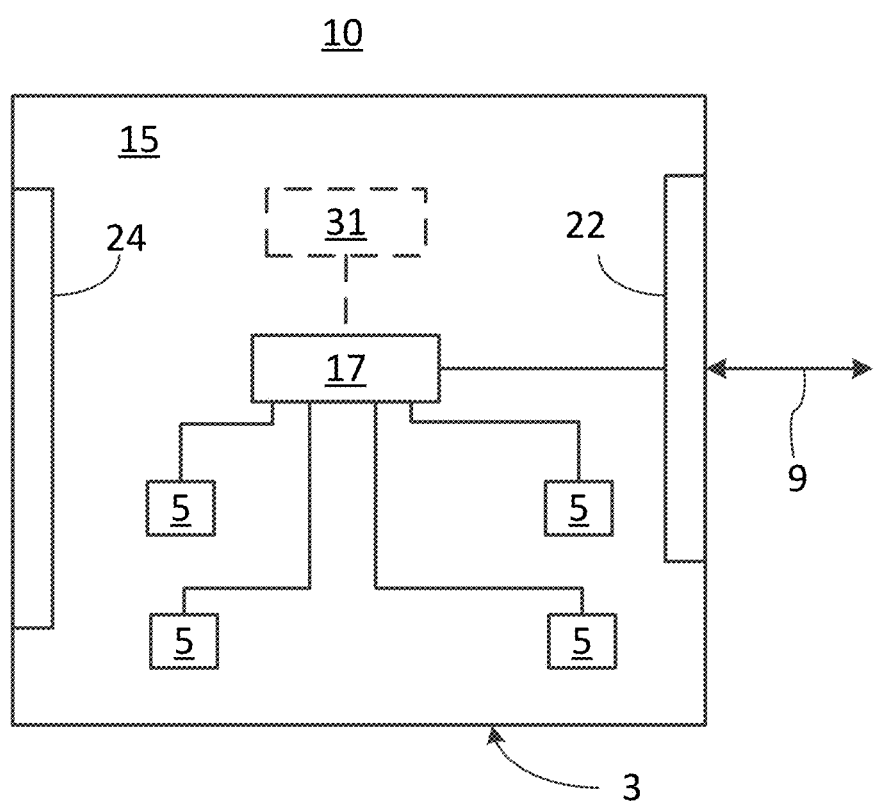
FIG. 1 is a schematic block diagram of a haptic signaling apparatus.

Programming smart munitions may be logistically complex as it may require significant modification to the weapon or the use of a wireless, e.g. RF or optical, datalink. For broad deployment in military and law enforcement, modification of the weapon in the field may not be feasible. Similarly, RF datalinks are unreliable in the RF-contested environment of the battlefield. Optical systems are subject to dirt and water. Devices using electro-magnetic field induction methods are heavy, thereby reducing the overall range of the munition and increasing the soldier weight burden. On the other hand, programming of smart munition that is done in advance of the munition being loaded makes real-time target updates impossible.

Furthermore, soldiers may experience concomitant issues in aiming their weapon in contested environments, which may reduce their ability to aim down sights.

Some of the example embodiments described herein relate to a method and apparatus for providing a haptic feedback signal to a user holding a gun, the haptic feedback signal indicating to the user a gun rotation direction that better orients the gun to aim and/or fire at a target.

Some of the example embodiments described herein relate to a method and/or a system for programming smart munitions loaded in a gun using vibration signaling.

Some of the example embodiments described herein relate to a method of communicating programming information to smart munition within a gun using vibrations providing haptic feedback signal to a user holding the gun.

In some embodiments, desired changes in aiming direction may be haptically, i.e. through the sense of touch, communicated to the user by selectively pulsing (actuating) haptic actuators (HAs), e.g. vibration motors, in a desired direction of orientation change. In some implementations, the HAs may be sequentially disposed, i.e. spread, in a direction corresponding to a range of aiming angles, e.g. in a vertical or horizontal planes. In some implementations, the HAs may be spread along two non-parallel, e.g. orthogonal, axes.

By way of example, in embodiments where several haptic actuators are disposed along an axis having a pre-determine orientation to the gun and are individually haptically perceptible to the user, such haptic actuators may be sequentially excited, e.g. one after another, in an order that indicates the direction in which the aim is to be changed. In another example, simultaneous pulsing one or more haptic actuators may be a haptic signal indicating e.g. a target lock.

An aspect of the present disclosure relate to an apparatus for programming a munition loaded in a gun, the apparatus comprising: a body configured for being mechanically coupled to the gun and for being in a haptic contact with a user of the gun; one or more haptic actuators (HAs) mechanically coupled to the body for generating vibrations to provide a haptic signal to the user of the gun; and a haptic controller for causing the one or more HAs to modulate the vibrations with a munition programming signal comprising munition programming information.

In some implementations, the haptic controller may be configured to test a vibration response of the gun coupled to the body to detect mechanical resonance thereof, and to select frequencies of the vibrations away from the detected mechanical resonances. In some implementations, the haptic controller may be configured to test a vibration response of the gun coupled to the body to detect a frequency resonance thereof, and to adjust the vibrations so as to lessen the use of resonant or high-attenuation vibration frequencies. In some implementations, the haptic controller may be configured to cause the one or more HAs to vibrate at frequencies away from vibration frequencies wherein the detected frequency response is outside of a pre-determined range.

In some implementations, the one or more HAs comprises first and second HAs, and the controller may be configured to cause the first HA and the second HAs to vibrate at a first vibration frequency f1 and at a second vibration frequency f2, respectively, wherein f1≠f2. The haptic controller may be further configured to modulate one of the first and second HAs with the munition programming signal having a spectral bandwidth $\Delta F$, and wherein a difference vibration frequency $\Delta f=|f1-f2|$ exceeds $\Delta F$. In some of such implementations, the haptic controller may be further configured to test a vibration response of the gun coupled to the body to determine mechanical resonance thereof, and to adjust at least one of the first and second vibration frequencies away from responsive to the test. In some of such implementations, the haptic controller may be configured to test a vibration response of the gun coupled to the body to detect a frequency response thereof, and to select at least one of the first and second vibration frequencies away from vibration frequencies wherein the detected response is outside of a pre-determined range.

In any of the above implementations, the haptic controller may be configured to communicate with an external controller to receive the munition programming information therefrom.

In any of the above implementations, the one or more HAs may comprise a plurality of HAs spread along a pre-determined axis, and wherein the haptic controller is configured to selectively activate the HAs in an order or a spatial pattern configured to haptically communicate to the user a direction to a target.

A related second aspect of the present disclosure provides a methods for programming a munition loaded in a gun, the method comprising: mechanically coupling a body to the gun to be in a haptic contact with a user of the gun, the body comprising a haptic controller and one or more HAs configured for generating vibrations to provide a haptic signal to the user; and causing, with the haptic controller, the one or more HAs to modulate the vibrations with a munition programming signal comprising munition programming information. The method may be adapted to use with the munition comprising a vibration sensor and a munition controller coupled thereto; in some of such implementations, the one or more HAs comprise first and second HAs, and the method may further comprise: causing the first HA and the second HA to simultaneously vibrate at a first vibration frequency f1 and a second vibration frequency f2, respectively; using the vibration sensor to detect munition vibrations at a difference frequency $\Delta f=|f1-f2|$, or at a harmonic thereof; and de-modulating the munition programming signal from the detected vibrations.

A third aspect of the present disclosure provides an aim control apparatus, comprising: a body having a haptic surface; an orientation sensor fixed to the body and configured to provide body orientation information; a plurality of HAs disposed at a plurality of locations along the haptic surface to provide a plurality of haptic signals to a user holding or wearing the body; and, a haptic controller configured to selectively activate the HAs to haptically communicate to the user a direction that orients the body to aim at a target.

The plurality of HAs may comprise a plurality of vibration motors configured to excite vibrations in the body to provide the haptic signals.

In some implementations according to the third aspect, the haptic controller is configured to activate different ones of the HAs in a time sequence or order that provides a haptic indication of the direction. In an example implementation, the plurality of HAs comprises a pair of spaced apart HAs, and the haptic controller is configured to sequentially excite the HAs of the pair in an order perceptually indicative of the direction for the user.

In any of the above implementations the plurality of HAs may comprise a pair of spaced apart HAs, and the haptic controller may be configured to selectively excite only one of the HAs of the pair depending upon the direction.

In any of the implementations according to the third aspect the orientation sensor may comprise an inertia measurement unit (IMU).

In any of the implementations according to the third aspect the body is one of: a glove for gripping a gun therewith, a grip portion of the gun, or an attachment for the grip portion. The gun may be capable of being loaded with a smart munition, and the haptic controller may be configured to generate an HA control signal for activating at least one of the plurality of HAs to vibrate for providing a haptic signal to the user, and to modulate the HA control signal with a munition programming signal for programming the smart munition within the gun.

In any of the above implementations the apparatus may comprise a communication interface configured to communicate the orientation information to an external controller and to receive an orientation change signal from the external controller, the orientation change signal comprising information indicating the direction. In some implementations, the haptic controller may be configured to receive munition programming information from the external controller, to cause the plurality HAs to generate first vibrations at a first frequency f1 and second vibrations at a second frequency f2 that is different from the first frequency, and to modulate at least one of the first and second vibrations to transmit the munition programming information. In some implementations the haptic controller is configured cause a first HA to generate the first vibrations and to cause a second HA to generate the second vibrations.

In the following description, for purposes of explanation and not limitation, specific details are set forth, such as particular circuits, sub-systems, optical and circuit components, mechanical elements, assemblies, or techniques, etc. in order to provide a thorough understanding of the present invention. However, it will be apparent to one skilled in the art that the present invention may be practiced in other embodiments that depart from these specific details. In other instances, detailed descriptions of well-known methods, devices, and tools are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The term 'periodically' as used herein does not presume the exact periodicity of a respective process or acts unless otherwise is explicitly stated, but simply indicates that the act repeats at time intervals that may or may not be equal. The terms "connected to", "coupled with", "coupled to", and "in communication with" may be used interchangeably and may refer to direct and/or indirect communication of signals between respective elements unless the context of the term's use unambiguously indicates otherwise.

Unless specifically stated otherwise and/or as is apparent from the following discussions, terms such as "processing," "operating," "computing," "calculating," "determining," or the like, refer to the action and processes of a computer, data processing system, logic circuit or similar processing device that manipulates and transforms data represented as physical, for example electronic, quantities.

In the following description, reference is made to the accompanying drawings which form a part thereof and which illustrate several embodiments of the present invention. It is understood that other embodiments may be utilized and structural and operational changes may be made without departing from the scope of the present invention. The drawings include flowcharts and block diagrams. The functions of the various elements shown in the drawings may be provided through the use of dedicated signal and data processing hardware such as but not limited to dedicated logical circuits within a data processing device, as well as data processing hardware capable of executing software in association with appropriate software. When provided by a processor, the functions may be provided by a single dedicated processor, by a single shared processor, or by a plurality of individual processors, some of which may be shared. The term "processor" should not be construed to refer exclusively to hardware capable of executing software, and may implicitly include without limitation, logical hardware circuits dedicated for performing specific functions, digital signal processor ("DSP") hardware, application specific integrated circuits (ASICs), field-programmable gate arrays (FPGAs), read-only memory ("ROM") for storing software, random access memory ("RAM"), and non-volatile storage. The term "(micro)controller" is used herein to refer to one or more integrated circuits comprising a (micro) processor and one or more communication interfaces and/or device interfaces including but not limited to analog to digital converters.

The terms "vibration actuator" and "vibration motor" are used herein interchangeably to refer to devices configured to vibrate responsive to a control signal, or cause vibrations in a medium in mechanical contact therewith, and encompass movable-mass motors and piezo-electric devices. The term "haptic actuator" (HA) refers to a vibration actuator configured to provide haptic feedback to a user. The term "haptic" is used here to refer to the sense of touch; "haptic surface" refers to a surface of an article ("body") configured to be touched by a person operating or wearing the article and capable of providing tactile feedback to the person touching the surface. For example, the surface, or a portion thereof configured to be touched, may be made to vibrate thereby providing a tactile, i.e. haptic, signal to the person touching it. The term "haptic sensor" refers to a sensor responsive to haptic signals, e.g. vibrations. An example of a haptic sensor is a vibration sensor, such as e.g. a piezo-electric element or an inertial sensor, by way of non-limiting examples.

The term "gun" as used herein encompasses firearms and other devices capable of shooting projectiles or sending some form of energy toward a target, and which can be suitably aimed by adjusting the orientation thereof relative to the target or a projected location thereof. The act of ejecting the projectile, or e.g. a beam of electromagnetic (EM) energy, may be referred to herein as "firing", and is typically initiated by pressing a trigger. At least some of the example embodiments described herein relate to guns at least a portion of which is adapted to be held or gripped by a person ("user" or "operator") prior and during the firing. A gun typically includes a barrel which orientation defines an initial trajectory of the projectile.

The term "munition" as used herein refers to a projectile adapted to be ejected from the barrel of a gun. A munition may include explosive or non-explosive (e.g. compressed air) propellant, which activation ejects the munition out of the gun. The term "smart munition" refers to a munition that may be programmed in some way; e.g. a smart munition may include a charge that may be activated in-flight at a programmable location in space or at a particular time delay after the firing ("time-of-flight" parameter). Smart munition may further include a means, e.g. additional propellant, to adjust the flight trajectory, and a programmable controller to activate the additional propeller, e.g. with a programmable time delay or at a programmable location or distance from the target.

FIG. 1 shows a functional block diagram of a haptic signaling apparatus 10 ("apparatus 10"), with FIGS. 2A-5 schematically illustrating some example implementations of the apparatus. In example embodiments described herein, apparatus 10 is configured to be used by a person ("user") operating a gun, e.g. as a signaling interface between the user, the gun, and an external control system. The signaling includes, but may not be limited to, haptic signaling using vibrations. Apparatus 10 may be referred to as a haptic module or a haptic feedback module. In some embodiments apparatus 10 may be configured as an aim control apparatus. In some embodiments, apparatus 10 may be configured as a munition programming apparatus, e.g. for programming a munition loaded in the gun.

In a typical embodiment, apparatus 10 includes a body 15 having a haptic surface 3, i.e. a surface configured to be, when in use, in a haptic contact with the user, e.g. a hand of the user. Apparatus 10 further includes one or more haptic actuators (HA) 5 coupled to the body 15 to excite vibrations in the body 15 transmittable through the haptic surface 3, and a haptic controller (HC) 17 in communication with the HAs 5 for controlling the HAs. The HAs 5 may be operable by the HC 7 to transmit vibration signals to at least one of: the user of the gun, and the smart munition in the gun being handled, e.g. gripped, by the user. Although four HAs 5 are shown in FIG. 1 by way of example, embodiments with any number of HAs 5 equal or greater than one are within the scope of the present disclosure.

In some embodiments, apparatus 10 may include a mechanical interface 24 for attaching the apparatus to a gun to couple the vibrations to a body of the gun. The mechanical interface 24 may include, e.g. a mechanical or magnetic clip-on or click-in device, or be configured to use a suitable fastener for attaching, at least in some embodiments removably, apparatus 10 to a gun.

Figure 6:
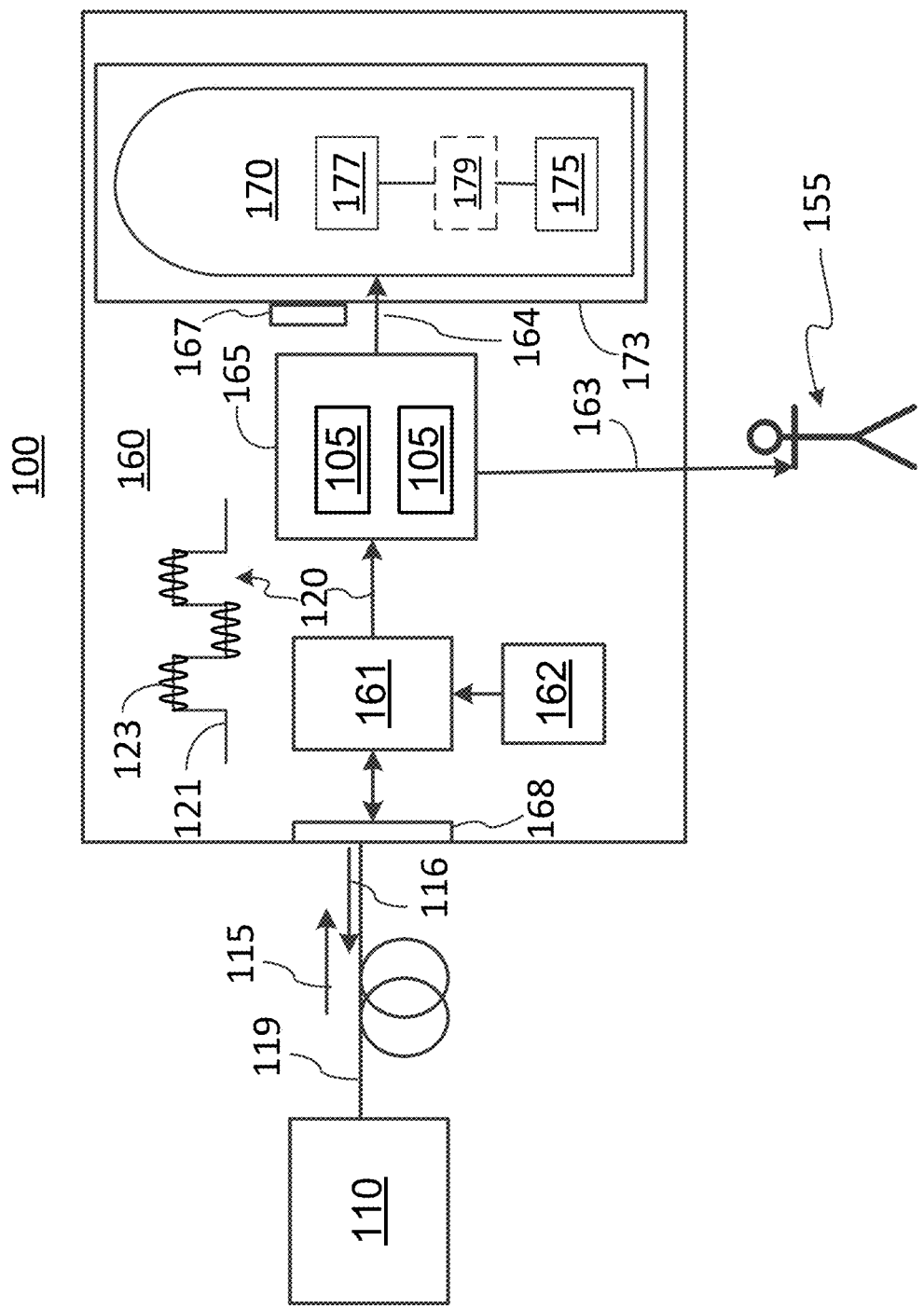
FIG. 6 is a schematic block diagram of a gun control system with vibration signaling.

Apparatus 10 further includes a communication interface 22 for communicating with an external controller, such as e.g. controller 110 shown in FIG. 6 (not shown in FIG. 1) via a communication link 9. The communication link 9 may be a wired link, as in the illustrated example, or a wireless link, e.g. using the Bluetooth or other suitable wireless communication technology. In some embodiments the external controller may comprise a targeting system, such as e.g. a targeting system of an ATAK (android team awareness kit) or similarly enabled device. In some embodiments, the external controller may be configured to provide programming instructions for programing a smart munition. The HC 17 may be configured to communicate with the external controller via the communication interface 22.

In some embodiments apparatus 10 may also include an orientation sensor 31 coupled to the communication interface 22, for example via the HC 17, to communicate body orientation information to the external controller. In one embodiment, the HC 17 is operable to receive aim control signals from the external controller via the communication interface 22. The aim control signals may comprise information for selectively activating the HAs 5. In an embodiment, the HC 17 embedded in the body generates HA control signals to selectivity vibrate HAs 5 based on the current orientation of the orientation sensor 31 for providing a haptic feedback to the user, e.g. to adjust the aiming direction to better aim at a target.

The HAs 5 may include vibration motors, such as but not exclusively linear resonance actuator (LRA) vibration motors and/or eccentric rotating mass (ERM) vibration motors, and may further include suitable driving circuitry ("HA drivers") receiving control signals from the HC 17. In some embodiments the HAs 5 may include piezo-electric vibration actuators. The HAs 5 are operable to haptically, i.e. through a sense of touch, provide signals to the user of the gun. In some embodiments the signals may be configured to communicate aiming information to the user, such as information indicating a direction to a target. In some embodiments the signals may be configured to haptically communicate to the user a direction in which the body 15 is to be moved or rotated to orient the body to aim at the target. In some embodiment, the aiming information may comprise information indicating target lock.

Figures 2A, 2B:
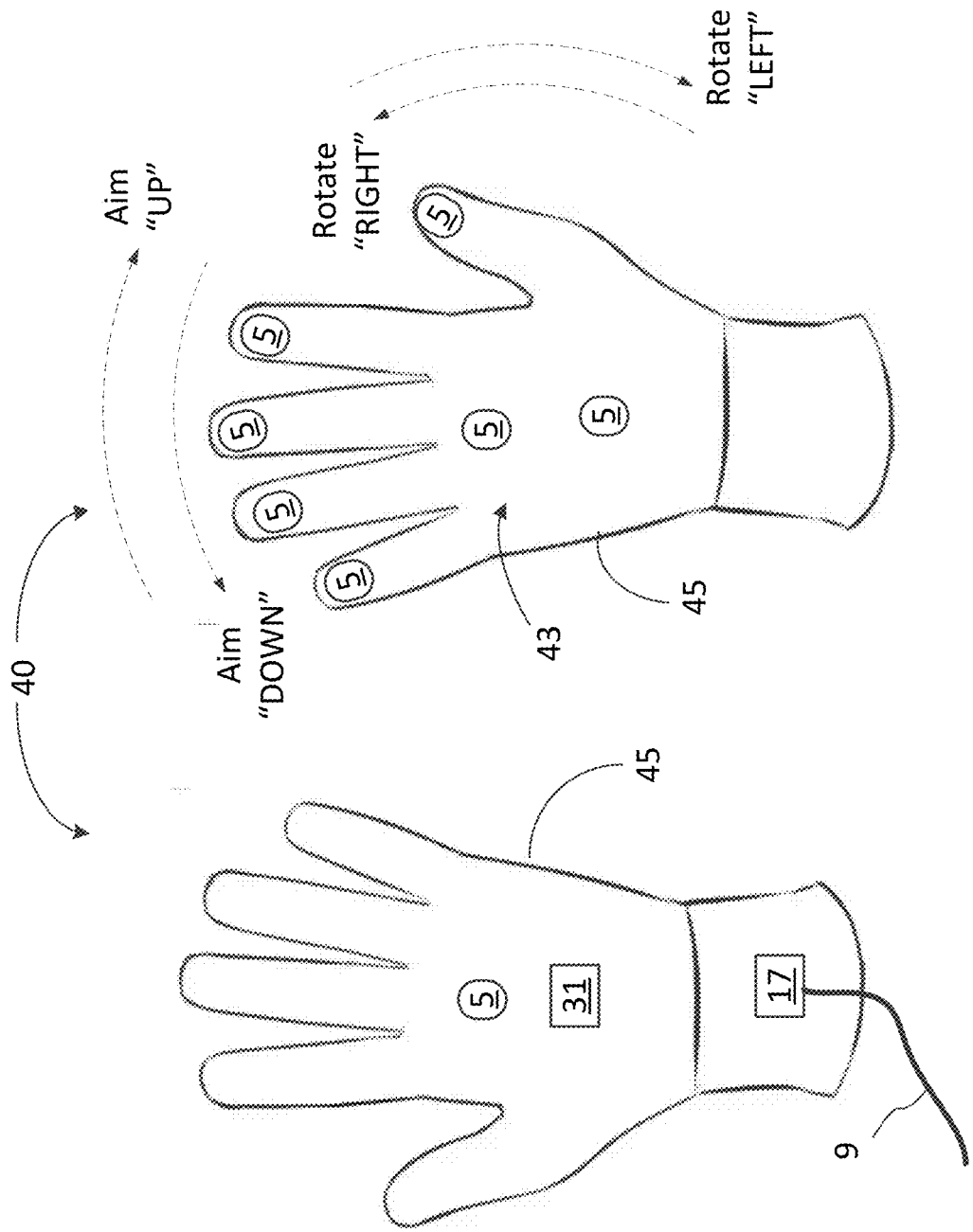
FIG. 2A schematically illustrates a back-side view of a right-hand glove configured with a haptic signaling system.
FIG. 2B schematically illustrates a palm-side view of the right-hand glove of FIG. 1A.

FIGS. 2A and 2B illustrate an example embodiment wherein apparatus 10 is implemented in a glove 40 that the user of the gun may wear to operate the gun, e.g. by gripping a part of the gun with the glove-wearing hand. By way of example, a right-hand glove is shown. In this implementation, the body 15 is a body 45 of the glove 40, and the haptic surface 3 is a palm-side surface 43 of the glove 40. The orientation sensor 31 may be placed, i.e. embedded or fixedly attached, to the glove body 45 at a suitable location, e.g., in the center of the palm or at the back of the glove. The HAs 5 are incorporated in the body 45 of the glove 40 to transmit vibrations they generated to a user's hand wearing the glove and to a gun being gripped by the hand. In various embodiments, the haptic module 50 may have one or more HAs 5 coupled thereto.

Figure 3:
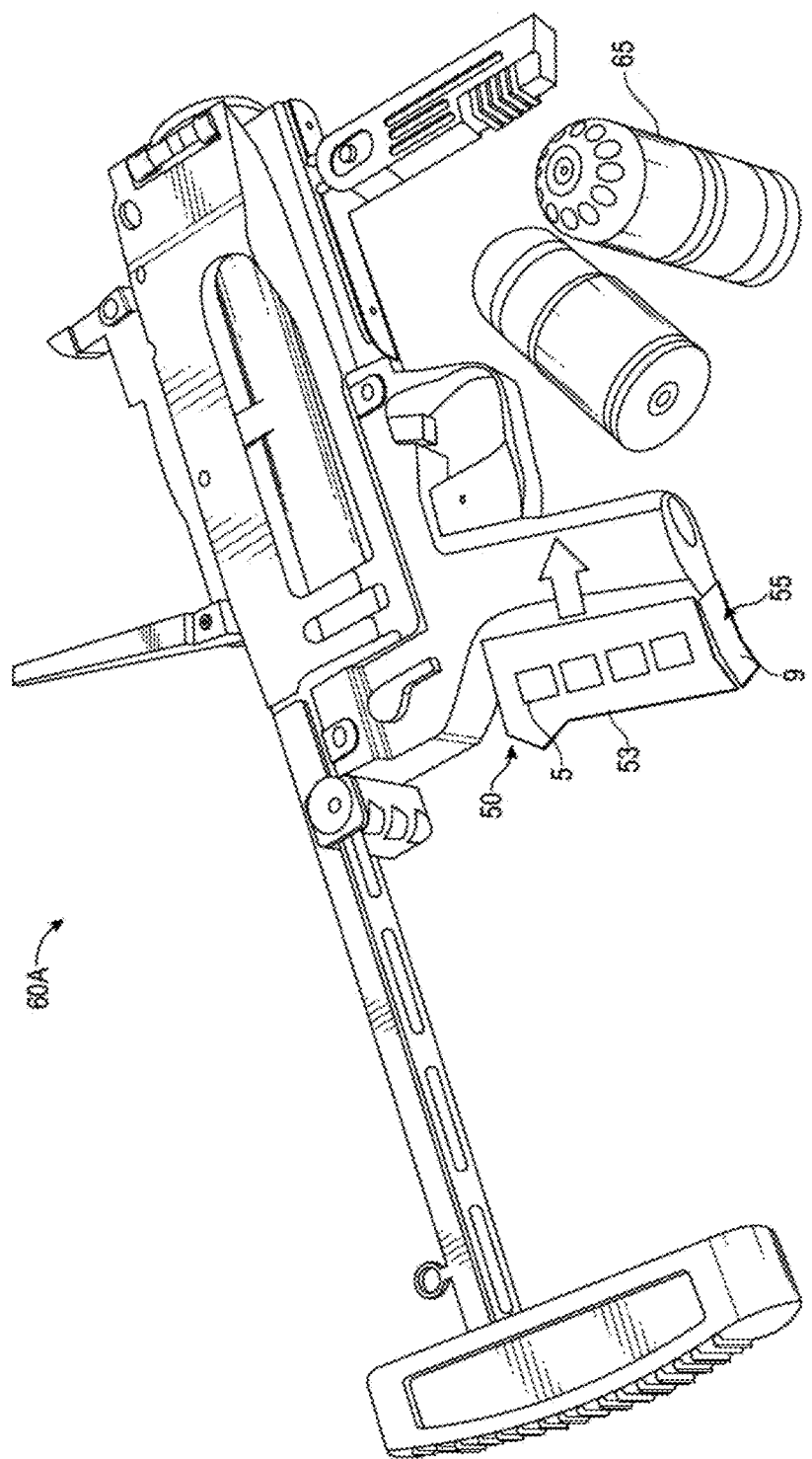
FIG. 3 illustrates a gun with a haptic signaling module attached to a pistol grip.
Figure 4:
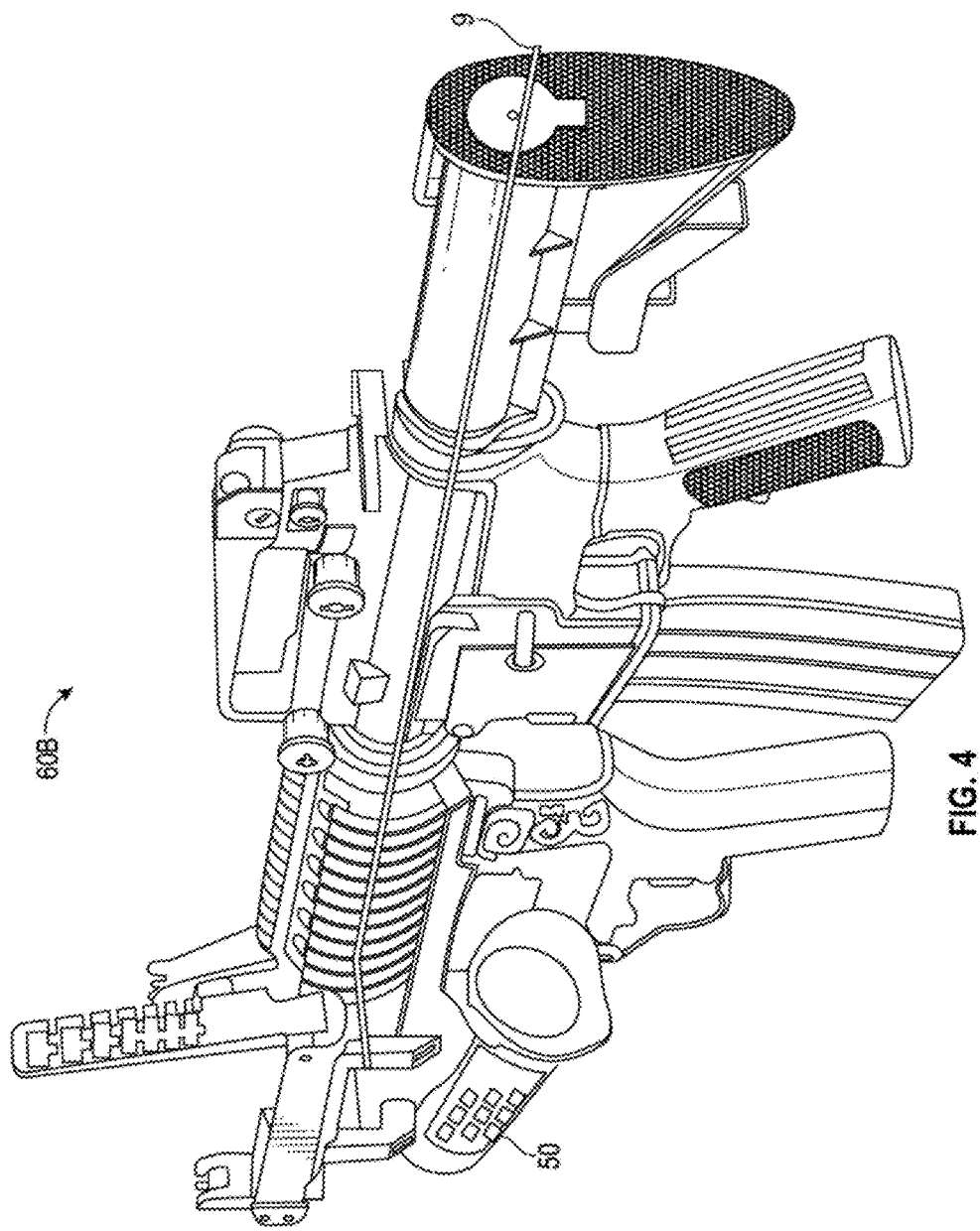
FIG. 4 illustrates a gun with a haptic signaling module attached to a grip portion of the barrel.
Figure 5:
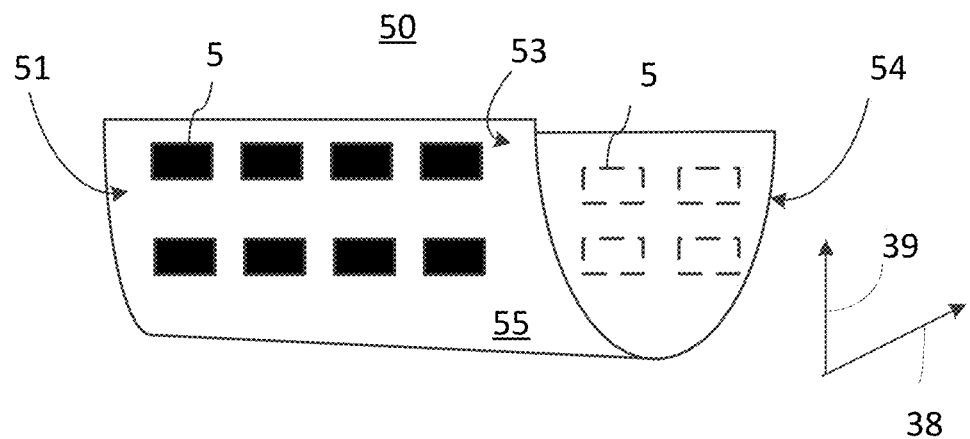
FIG. 5 is a schematic diagram illustrating a perspective view of a haptic module for attaching to a gun according to an embodiment.

FIGS. 3-5 illustrate examples where apparatus 10 is implemented as a haptic module 50 for a gun, e.g. as a "clip-on". In the illustrated embodiments, the haptic module 50 is configured for attaching, e.g. removably, to a portion of the gun configured to be gripped by the user operating the gun ("grip portion"), e.g. when aiming at a target or preparing to aim. In the embodiment of FIG. 3, the haptic module 50 is attached to a pistol grip of a gun 60A. In the embodiment of FIG. 4, the haptic module 50 is attached to a grip portion of the barrel of a gun 60B. FIG. 5 schematically illustrates the haptic module 50 separately from a gun. The HAs 5 are incorporated in the body 55 to transmit vibrations they generated to the gun 60A or 60B and to the hand of the user holding the gun at the grip portion having the module 50 attached thereto. In various embodiments, the haptic module 50 may have one or more HAs 5 coupled thereto.

Referring to FIGS. 1-5, some embodiments may include a plurality of HAs 5 that are spread along an axis having, in use, a pre-determined orientation relative to the gun. In some embodiments, the plurality of HAs 5 may be spread along two non-parallel, e.g. orthogonal, axes having pre-determined orientations relative to the gun, when the apparatus is in operation and the body, e.g. 15, 45, or 55, is in a direct fixed contact with the gun. Responsive to control signals from the HC 17, the HAs 5 may be selectively activated, e.g. in a time sequence or order that haptically indicates to the user holding the body 15 a direction in which the orientation of the gun is to be changed. The time delay between activating consecutive HAs 5 may be chosen to be perceptible to the user, e.g. in the range from about 0.1 sec to about 0.5 sec.

Referring to FIGS. 2A and 2B, in an example embodiment HAs 5 may be placed at the fingertips, center palm, and/or base palm of the glove 40 for wearing on a grip hand. The HAs 5 located at the fingers of the glove 40 may be excited in a sequence from left to right or right to left to indicate whether to rotate the hand within the glove up or down. The HAs 5 located at the palm of the glove 40 may be selectively excited, e.g. in different orders, to indicate whether to rotate the hand in the glove right or left. In some embodiments, one or more HAs 5 may be placed on the palm-side and the back-side of the glove, to be selectively excited to indicate whether to rotate the hand to the right or to the left. For example, selectively exciting only the HAs 5 located at the palm-side of the right-hand glove 40 (FIG. 5B) may indicate a desired hand rotation to the left, while selectively exciting the HAs 5 located at the back-side of the right-hand glove 40 (FIG. 2A) may indicate a desired hand rotation to the left. The user may then adjust the aim by slightly rotating the hand gripping the gun in the direction corresponding to the HA activation order.

Referring to FIGS. 3-5, the haptic module 50 may include a plurality of HAs 5 that are placed so as to provide directional indications in at least two axes, e.g. along axis 38 indicating a direction of body rotation to change the yaw angle, and along axis 39 indicating a direction of body rotation to change the pitch angle (FIG. 5). The sequence or order in which the HAs 5 of the module 50 are excited may indicate to the user the desired change in the gun orientation, e.g. as described above with reference to the glove 40.

By way of example, the HAs 5 in FIG. 5 may be disposed in two or more rows along the module 50, i.e. in the direction of the barrel of the gun; activating one or more lower-row HAs 5 (relative to the indicated direction of the pitch axis 39) with some delay after one or more top-row HAs 5, i.e. in a time sequence from top to bottom, may indicate to the user to aim lower; activating one or more top-row HAs 5 with some delay after one or more lower-row HAs 5, i.e. in a time sequence from bottom to top, may indicate to the user to aim higher. Similarly, left-to-right or right-to-left HA excitation sequences (yaw axis 38) may signal to aim more right or more left, respectively, by way of example. In some embodiments, selectively vibrating only the HAs 5 positioned at one side of the module 50, e.g. side 51, may indicate to the user to rotate the barrel of the gun in the direction of the side 51, e.g. to the left in the illustrated embodiment. Selectively vibrating only the HAs 5 positioned at the other side of the module 50, e.g. side 54, may indicate to the user to rotate the barrel of the gun in the direction of the side 54, e.g. to the right in the illustrated embodiment.

Haptic feedback signaling may also be used to transmit programming information to a smart munition, e.g. munition 65 in FIG. 3, when the smart munition is in the barrel of a gun being held or gripped by the user. The smart munition may include programmable means for controlling e.g. munition charge detonation and/or trajectory after firing.

In an embodiment, the HAs 5 may be operated to generate vibrations transmitting information to both the user and to the smart munition loaded in the gun being operated by the user. Munition programming information destined to the smart munition, e.g. 65 in FIG. 3, may be encoded within the haptic vibrations using one of a plurality of available methods, such as for example amplitude modulation, frequency modulation, phase modulation, or some combination thereof. The munition programming information may include target information, such as e.g. time-of-flight (the time from the firing of the gun to the detonation, or otherwise detonation, of the munition), and/or information indicative of the target's current and/or projected locations, e.g. the latitude, longitude, altitude, and motion vectors of the target. Data destined for the smart munition may be sent via the communication link 9 to a haptic controller 7, to modulate the haptic vibration with a munition programming signal that contains programming information for the smart munition (e.g. 65, FIG. 3) when the smart munition is within the barrel of the weapon.

When located in a glove, e.g. as illustrated in FIGS. 2A and 2B, the HAs 5 may be placed such that the vibrations they generate are coupled to an object that is touched or gripped by the hand wearing the glove, i.e. a gun, preferably with minimal loss of vibration energy.

In some embodiments a haptic feedback system substantially as described above may be embedded within a gun or an attachment to the gun to provide haptic feedback to the user of the gun with the vibrations, while also, e.g. simultaneously, transmitting control and/or programming information to a smart munition within the weapon's barrel. The haptic feedback may be, but not exclusively, via specific vibration sequences, or spatial patterns, perceptible by the user as indicating a corresponding specific direction, FIG. 6 schematically illustrates a block diagram of a gun system 100 configured to provide haptic signals to a user 155 in tactile communication with a gun 160. The guns 60A and 60B illustrated in FIGS. 3 and 4 may be embodiments of the gun 160. In an embodiment, the gun 160 is capable of using programmable smart munition 170, and the system 100 is further capable of programming the smart munition 170 within the gun, e.g. loaded in a barrel 173 of the gun 160. In one embodiment, the programmable smart munition 170 includes one or more vibration sensors 177 and a munition controller (MC) 175 in communication with the vibration sensors 177. In some embodiments, a passband filter 179 may be provided at the electrical output of the vibration sensor(s) 177, enabling the MC 175 to detect vibration signals within a target frequency band. The MC 175 may include one or more microcontrollers comprising one or more microprocessors and is configured to program one or more munition subs-systems (not shown), such as e.g. a programmable detonator and/or a programmable propellant ejector, responsive to programming information encoded in the detected vibration signals. The vibration sensor(s) 177 may be embodied e.g. using one or more inertial vibration sensors, piezo-electric vibration sensors, accelerometers, or other suitable devices capable of generating electrical signals responsive to vibrations. In some embodiments, the vibration sensor(s) 177 may be embodied using an IMU capable of a sampling rate corresponding to a data rate of munition programming signals carried by the vibrations.

Figure 7:
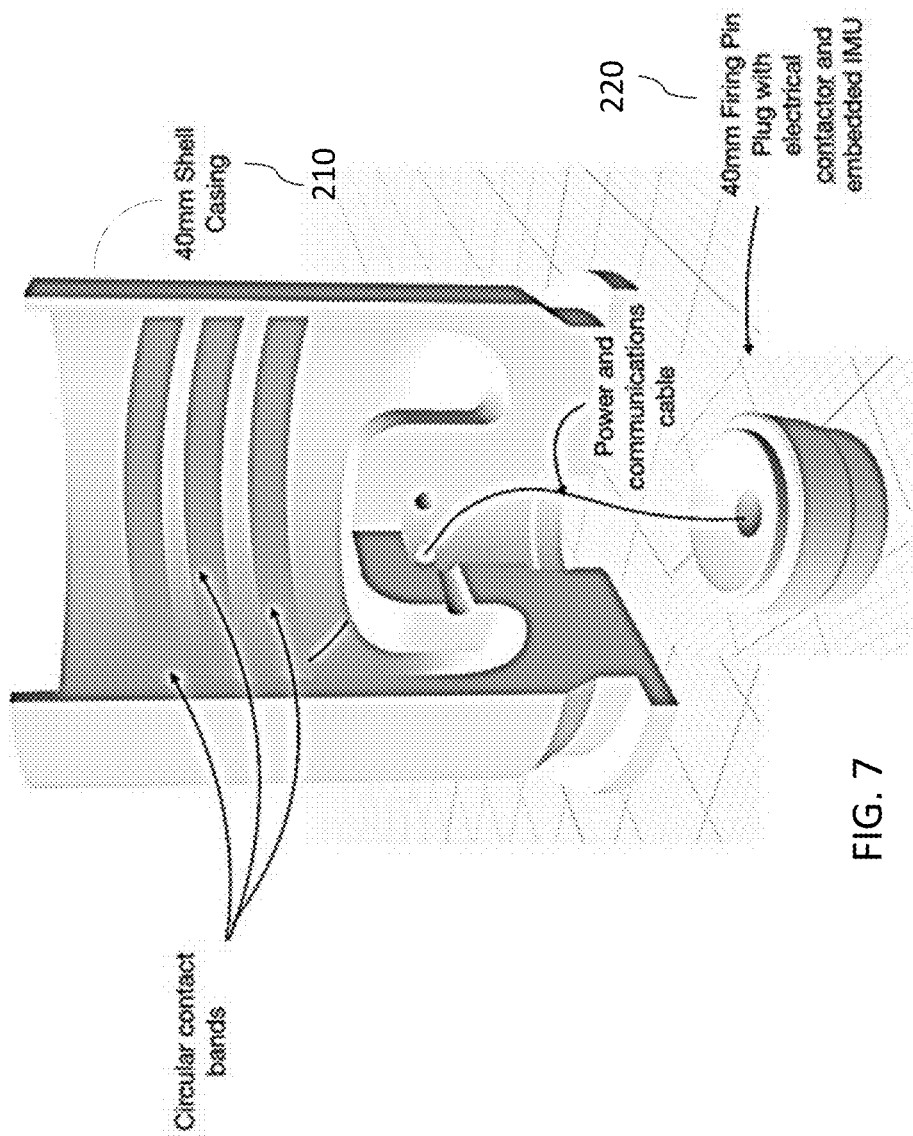
FIG. 7 is a partial sectional view of a smart munition showing example vibration sensing portions thereof.

FIG. 7 illustrates, by way of example, some elements of the smart munition 170 in an example implementation. In this example, the rear-half of a conventional munition is replaced with a haptically programmable shell. The shell casing 210 accepts a firing pin 220 incorporating a vibration sensor therewithin (not shown), e.g. an IMU capable of 14-bit precision in a range of accelerations +/−2 g. The vibration sensor may be capable of sampling of at least the Nyquist rate in accordance to a selected vibration carrier frequency. Electrical signals generated by the IMU from the vibrations are provided to a munition controller located within the casing 210 for decoding of the munition programming signals (e.g. MC 175 of FIG. 6; not shown in FIG. 7).

Referring back to FIG. 6, the gun 160 may include, or be in a mechanical contact with when in operation, a haptic module 165 comprising one or more HAs 105; two HAs 105 are shown in FIG. 6 by way of example. The haptic module 165 may be e.g. a haptic grip or patch configured to be gripped by the user 155 when operating (firing) the gun, and may also be referred to as the haptic feedback module. In one example embodiment, the haptic module 165 may be comprised in a glove, e.g. as described above with reference to FIGS. 2A and 2B. In one example embodiment, the haptic module 165 may be embodied as an attachment to the gun, e.g. as described above with reference to FIGS. 3-5 and the haptic module 50.

An orientation sensor 162, e.g. an IMU, may be provided in some embodiments to generate current gun orientation information, based on which haptic feedback signals may be generated indicating a direction in which the orientation of the gun 160 is to be adjusted to aim at a target, e.g. as described above with reference to the embodiments of FIGS. 1-5. The orientation sensor 162 may be an embodiment of the orientation sensor 31 described above. In one embodiment, the gun orientation information from the orientation sensor 162 may be provided to a communication interface 168 for communicating gun orientation signals 116 to an external controller 110, e.g. via a haptic module controller (HMC) 161 and a communication link 119. When provided, the orientation sensor 162 may be located within the haptic feedback module 165 with the HAs 105, or it may be incorporated elsewhere in the gun. The HMC 161 may be an embodiment of the HC 17 described above. The communication link 119 may be as described above with reference to FIG. 1 and communication link 9.

In an embodiment, the external controller 110 may be configured to generate control signals 115 based in part on the received gun orientation signals 116 and information indicative of a position of a target relative to the gun, which may be obtained elsewhere, e.g. from a (military) position awareness system. The HMC 161 is configured to generate HA control signals 120 based at least in part on the control signals 115.

In an embodiment, the external controller 110 is configured to generate control signals 115 carrying information for controlling the operation of HAs 105 to provide haptic feedback 163 to the user 155, e.g. as described above, and also carrying munition programming information 164 for programming the smart munition 170. E.g. the HMC 161, responsive to the control signals 115 from the external controller 110, may generate HA control signals 120 wherein signals 121 encoding haptic feedback 163 are multiplexed with munition programming signals 123 that carry the munition programming information 164. The HMC 161 may be embodied e.g. with one or more suitable microcontrollers, requirements to which will be evident to those skilled in the art from the present description. The HMC 161, e.g. a suitable microcontroller, may also be incorporated into the same haptic module 165 or provided elsewhere in the gun. In an example embodiment control signals 115 are electrical signals, but embodiments wherein the control signals 115 are optical signals may also be contemplated.

In some embodiments, the signals 121 carry haptic feedback information causing the HMC 161 to excite the HAs 105 for providing haptic feedback 163 to the user 155, e.g. as described above with reference to FIGS. 1-3B. The munition programming signals 123, which may be combined with the signals 121, carry information for programming the smart munition 170. In some embodiments signals 123 may be higher-frequency signals superimposed upon lower-frequency signals 121. By way of example, in some embodiments the signals 121 may be periodically updated responsive to the gun orientation information, e.g. at an update rate in the range of five to ten updates per second. The munition programming signals 123 may have a rate in the range of e.g. 100 bps to 4,096 bps (bits per second).

In an embodiment, the control signals 115 and 120 may comprise timing information defining the order in which the individual ones of the HAs 105 are to be excited. The HMC 161 may be configured to process the control signals 115 to generate the HA control signals 120 for controlling individual HAs 105 to selectively excite the HAs 105 to cause the selected ones of the HAs 105 to vibrate. For example, the HAs 105 may be excited sequentially in time in a selected order, e.g. to indicate to the user 55 a direction in which the aiming angle should be changed, e.g. as described above.

When the haptic module 165 is attached to the gun 160 in a close mechanical contact therewith, the HAs 105 are vibrationally coupled to the barrel 173 of the gun 160 where munition 170 is located, so that the HA-generated vibrations are transmitted to the munition 170 located within the barrel 173, e.g. the casing 210 (FIG. 7) in a mechanical contact with the barrel, and are detectable by the vibration sensors 177. The vibrations excited by the HAs 105 may carry munition programming signals 123, which may be received by the vibration sensors 177 of the munition. The vibration sensors 177 convert the received vibrations into electrical signals, which are provided to the munition controller (MC) 175, in some embodiments via the passband filter 179. The MC 175, e.g. a suitable microcontroller, is configured to detect the munition programming signals 121 in the electrical signals received from the vibration sensor(s) 177, and to extract munition programming information therefrom to program the munition 170 accordingly. In one embodiment the MC 175 may be a programmable microcontroller that is configured to control munition's behavior, e.g. time to ignition, time of flight, one or more other fight parameters, e.g. as described above. In some embodiments, the MC 175 may include a separate microprocessor that controls the munition's behavior responsive to the munition programming information extracted from the detected vibrations.

In some embodiments the HMC 161 may be configured to operate the HAs 105 to vibrate at some carrier frequency Fc to provide the haptic feedback 163 to the user, and to modulate the vibrations, e.g. in frequency and/or amplitude, and to transmit the munition programming information 164. The carrier frequency Fc may be centering a modulation frequency band B=[Fmin, Fmax] of width $\Delta F$, i.e. extending from Fmin=(Fc$-\Delta F/2$) to Fmax=(Fc$+\Delta F/2$).

In some of such embodiments, the carrier frequency Fc, at least, or the modulation frequency band B may be selected to be shifted away from a resonant frequency of the HA 105 being modulated, to avoid "locking" of the modulation at the resonant frequency of the HA 105. By way of example, one of the HAs 105 may be a LRA motor having a resonant frequency 200 Hz, and the carrier frequency may be 250 Hz. In some embodiments, the carrier frequency Fc may be selected away from vibration resonances of the haptic module 165 and/or the gun 160. When no munition programming data is transmitted, the HA 105 may be operated to vibrate at the resonant frequency of the HA or at a shifted frequency to provide the haptic feedback 163 to the user.

In some embodiments, the HMC 161 may be configured to perform auto-calibration of the gun 160 with the haptic module 165 incorporated therein to determine relevant resonant vibration frequencies of the system and to select the modulation frequency range, or frequency bins therein, that are comparatively less affected by the mechanical resonances of the system. In some embodiments, the auto-calibration may include using a test signal, e.g. a temporary pulse pattern or a vibration frequency scan, to excite the HA(s) 105, to record the response of a vibration sensor, such as a vibration sensor 167 that may be present in some embodiments, e.g. in the haptic module 165 preferably in contact with the barrel 173, or the vibration sensor 177 of the smart munition 170 in embodiments where the HMC 161 can receive signals from the munition 170. The HMC 161 may then select, and/or (optionally) adjust the frequency modulation band responsive to the recorded response. The recorded response may be saved and used by the MC 175 in de-modulation of the munition programming signal 123. In some embodiments the HMC 161 may operate the HAs 105 so as to avoid, or at least lessen the use of, vibration frequencies where the detected frequency response is outside of a pre-determined range of values, e.g. to avoid vibration frequencies close to mechanical resonances of the gun and/or which are excessively attenuated in the gun.

In an example embodiment, the HMC 161 may be configured to modulate an HA 105 using an MFSK (multiple frequency shift keying) modulation format, or a version thereof with multi-level amplitude shift keying in each frequency bin of a constant width, and is further configured to adjust starting frequencies of the frequency bins in dependence upon the recorded vibration response. In some embodiments, the HMC 161 may be configured to use a semi-continuous training algorithm, e.g. repeating the auto-calibration as described above at some time intervals, when the gun 160 is in operation by no munition programming data is being transmitted.

Some embodiments may utilize a modulation format, referred herein as an interference shift keying (ISK), wherein two HAs attached to a solid medium some distance apart are activated to vibrate at different carrier frequencies, and a vibration sensor disposed in a mechanical contact with the medium at a distance from each of the HAs is configured to detect vibrations at a difference frequency, a harmonic thereof, or some other linear combination of the two carrier frequencies that may be generated in the medium, e.g. due to non-linearity of the medium response to vibrations.

Referring again to FIG. 6, in an example embodiment one of the HAs 105 shown may be operated to vibrate at a first vibration frequency f1, and the other of the HAs 105 shown may be operated to vibrate at a second vibration frequency $f2=(f1+\Delta f)$. One of these HAs 105 may be modulated with a munition programming signal with a modulation bandwidth $\Delta F$. The frequency shift $\Delta f$ may be at least equal, or exceed, the modulation bandwidth $\Delta F$. Vibrations generated by the two HAs 105 may generate an interference pattern of vibrations in the gun barrel 173 that is detected by the vibration sensor 177. The vibration sensor 177 and/or the MC 175 coupled thereto may be configured, e.g. using the passband filter 179, to detect vibrations at and near the difference frequency Δf with the bandwidth ΔF, or at a harmonic of the difference frequency Δf within a corresponding modulation bandwidth.

By way of example, the HAs 105 are operated so that f1=8 kHz, f2=8.4 kHz, and the carrier frequency f2 is MSFK-modulated with 17 frequency bins within a +\−200 Hz bandwidth (ΔF=400 Hz). Using the passband filter 179 with a passband of 200 Hz to 600 Hz, a down-converted version of the MSFK-modulated signal may be detected at the beat frequency Δf=400 Hz.

One advantage of using the ISK modulation approach is the ability to combine relatively high-frequency vibration motors with lower-frequency commercial vibration sensors, e.g. inertial sensors such as IMUs, that are relatively cheap and widely available. Furthermore, for a given frequency modulation bandwidth, the relative frequency modulation depth of a higher-frequency vibration motor may be relatively small, which may be potentially associated with smaller startup/trail-off times of the motor.

Embodiments of the present disclosure provide a method which, in various aspects, enables to use vibration signals in a gun system to provide at least one of: a haptic feedback to the operator of the gun, e.g. to adjust the aim direction, and/or to program smart munition loaded within the gun. In one embodiment, the method may comprise: providing a programmable munition with at least one vibration sensor, such as e.g. an inertial sensor or a piezo-electric vibration sensor, the vibration sensor being in communication with an on-board controller of the programmable munition; and with the programmable munition positioned in the barrel of the gun, using a vibration motor mechanically coupled to the gun to transmit vibrations through the barrel detectable by the vibration sensor, the vibrations encoding programming information for programming the on-board controller of the smart munition.

Embodiments of the present disclosure may be implemented with guns, e.g. of a conventional type, that are capable of firing programmable munitions but lack means of programming the munition after the munition is loaded into the gun.

Figure 8:
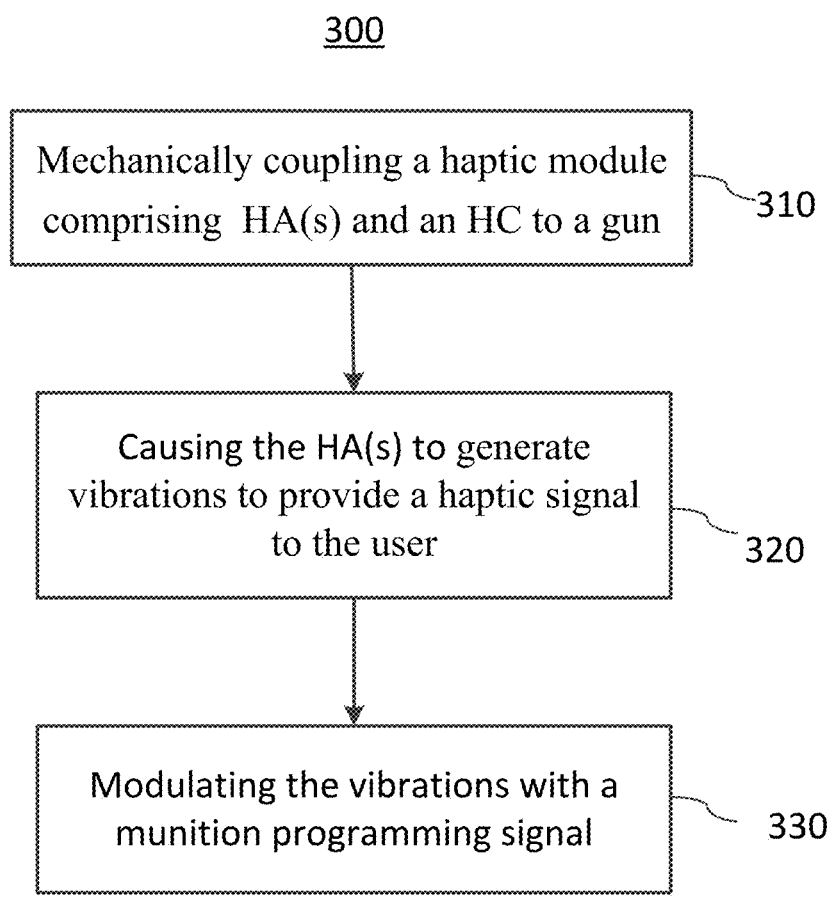
FIG. 8 is a flowchart of a method for munition programming using vibration signaling.

FIG. 8 illustrates a method 300 according to an embodiment; method 300 utilizes a haptic module ("body"), comprising a haptic controller, e.g. such as the HMC 161, and one or more haptic actuators, e.g. HAs 105, configured for generating vibrations to provide a haptic signal to the user of a gun, e.g. gun 160. Method 300 includes a step 310 of mechanically coupling the haptic module to the gun to be in a haptic contact with a user of the gun when the user operates the gun; e.g. the user may be gripping the gun at (with) the haptic module when preparing to fire. Method 300 further includes step 320 in which the haptic controller causes the one or more HAs to generate the vibrations to provide a haptic signal to the user, for example but not exclusively to indicate a rotation direction of the gun to aim at a target. At step 330, haptic controller modulates the vibrations with a munition programming signal comprising munition programming information.

In some embodiments step 320 may be preceded by an auto-calibration operation of seeking, testing, and/or pairing vibration frequencies, or modulation frequency ranges, so as to minimize data error rates (e.g. bit error rates) in the given operational environment, e.g. as described above. In some embodiments, the auto-calibration may be automatic. In other embodiments, the gun operator may manually select an optimal carrier vibration frequency, for example, based on a signal quality indicator from a signal detector circuit coupled to a vibration sensor.

Figure 9:
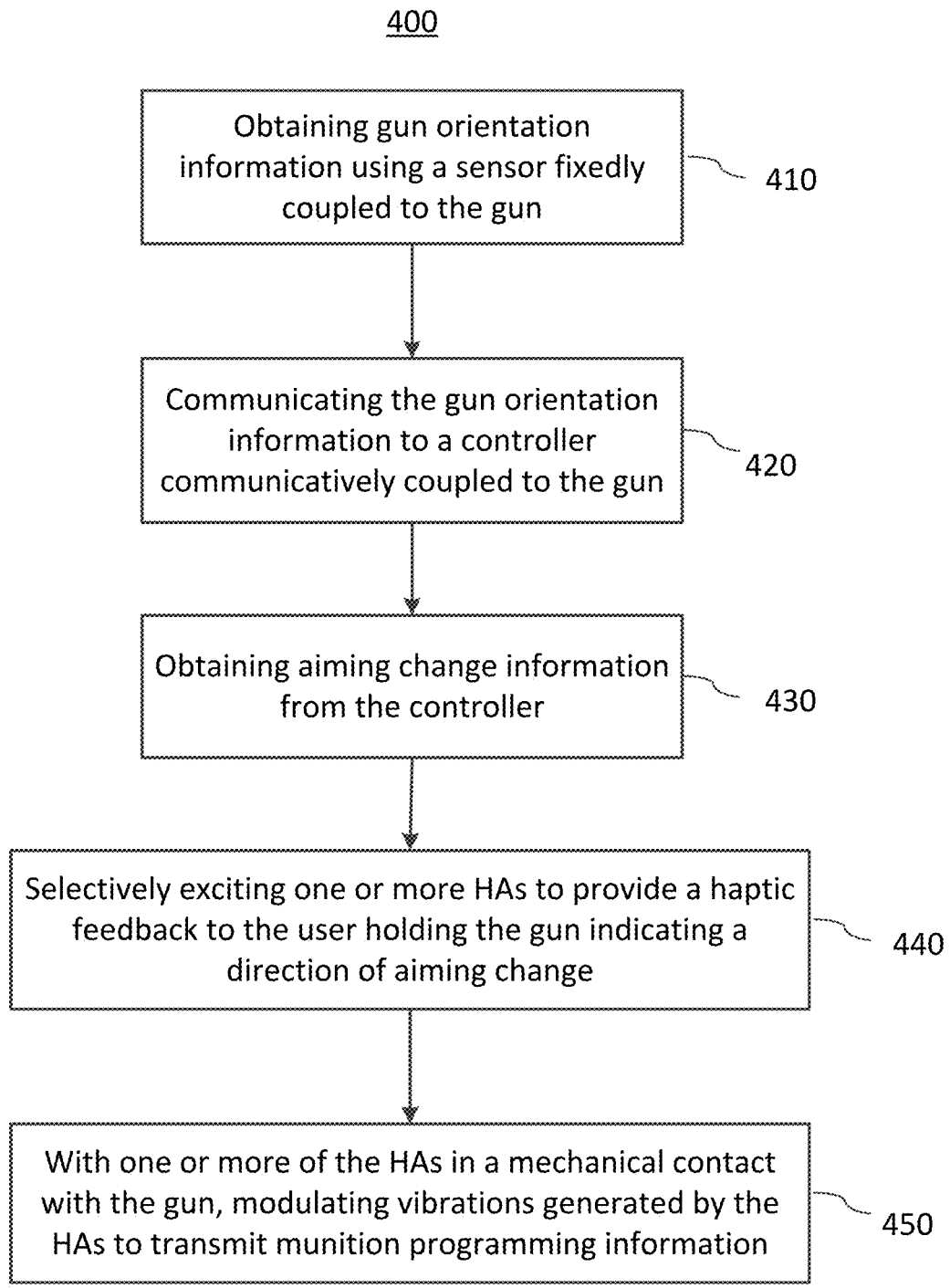
FIG. 9 is a flowchart of a method for a gun aim control using haptic feedback.

FIG. 9 illustrates steps of a method 400 for controlling the aim of a gun using haptic signals according to an embodiment. Method 400 may include a step or operation 410 of obtaining gun orientation information, e.g. using an orientation sensor, e.g. 31 (FIGS. 1, 2A) or 162 (FIG. 5), that is coupled to the gun (e.g. 20A in FIG. 2A, 20b in FIG. 2B, 160 in FIG. 6) in a fixed orientation relative to the gun. In some embodiments, the gun or aim orientation information may be obtained from an external controller. Method 400 may further include a step or operation 420 of communicating the gun orientation information to a controller communicatively coupled to the gun, e.g. the external controller 110 of FIG. 6. Method 400 may further include the step or operation 430 of obtaining information regarding a direction in which the gun orientation is to be changed to provide a better aim at a target, e.g. from the external controller 110 illustrated in FIG. 6. In an example embodiment, the controller may be equipped to determine the position of the target relative to the gun and is configured to determine the direction in which the current orientation of the gun is to be changed to improve aim. Method 400 may further include the step or operation 440 of using a plurality of spread apart vibration motors, e.g. HAs 5 (FIG. 1-5) or 105 (FIG. 6) in a haptic contact with the user holding the gun, and selectively exciting one or more of the vibration motors to provide a haptic feedback to the user indicating the direction in which the orientation of the gun is to be changed to improve aim. In some embodiments, method 400 may further include a step or operation 450 of modulating vibrations generated by at least one of the vibration motors, the at least one of the vibration motors being in a mechanical contact with the gun, to transmit munition programming information to a smart munition located in the barrel of the gun.

Figure 10:
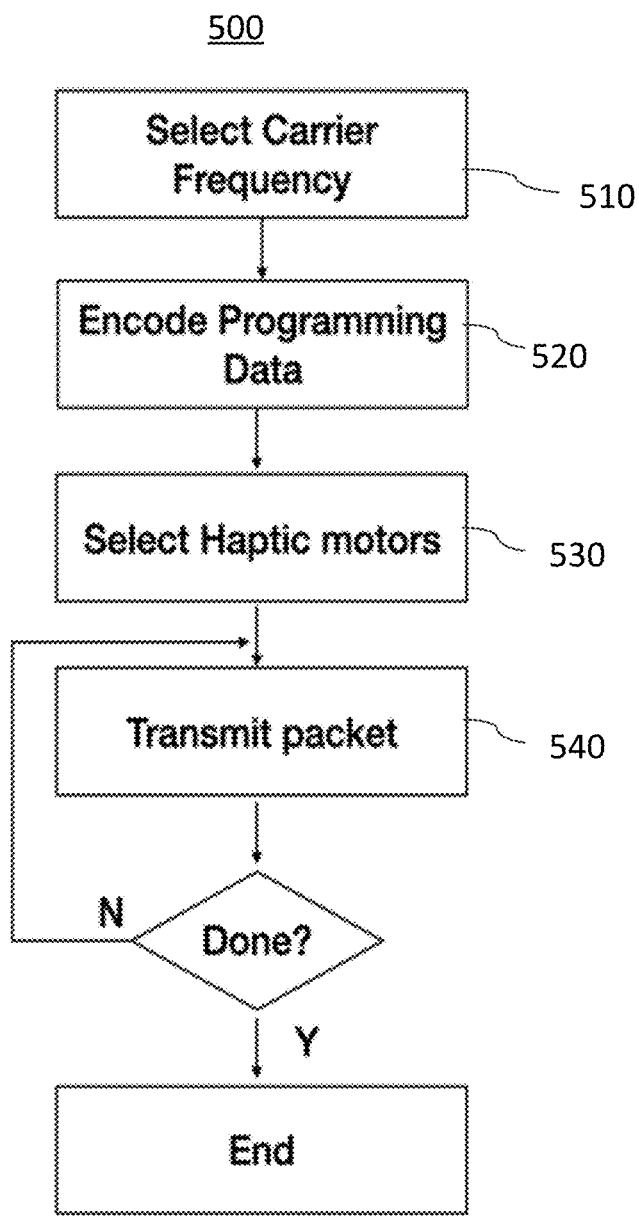
FIG. 10 is a flowchart of a method for munition programming using vibration signaling with frequency auto-calibration.

FIG. 10 illustrates steps of method 500 for programming smart munition loaded in the barrel of a gun, e.g. the gun 160 of system 100 illustrated in FIG. 6. Method 500 may include the step or operation 510 in which a carrier frequency for vibrationally transmitting programming information to the smart munition is selected. In some embodiments the carrier frequency may be selected to avoid mechanical resonances of the vibration motor used to excite the vibrations, and/or other mechanical resonances of the gun system, e.g. the barrel of the gun. In some embodiments the frequency may be e.g. in ranges above 2 kHz, or above 5 kHz, or above 10 kHz, to avoid lower-frequency noise associated with environments encountered in moving vehicles or soldier movements. In some embodiments step 510 may further include seeking, testing, and/or pairing carrier frequencies, or modulation frequency ranges, so as to minimize data error rates (e.g. bit error rates) in a given operational environment. Method 500 may further include step or operation 530 of encoding programming data to modulate the carrier vibration frequency, e.g. to form data packets. Programming data may include munition programming data such as time-of-flight, position of detonation, or motion vectors of a target to intercept. Encoding may include frequency shift keying, amplitude modulation, interference-shift-keying, some combination thereof. In the embodiment of FIG. 6, this step may be performed e.g. by the external controller 110 and/or the HMC 161.

In some embodiments, method 500 may include step or operation(s) 530 of selecting one or more HAs, such as e.g. HAs 5 or 105, that are mechanically coupled to the gun and in a haptic contact with the user holding the gun to selectively excite the HAs so as to provide aiming direction feedback to the user and, simultaneously or sequentially, to transmit the encoded munition programming data. For example, two or more HAs spread along a pre-defined direction may be excited to vibrate in a specific order as a haptic feedback to the operator to change the aim in a corresponding direction, as described above. The vibration frequency and/or amplitude of at least one of these HAs may be modulated to transmit munition programming data to the smart munition loaded in the gun.

Example embodiments described above may be implemented e.g. in firearms, e.g. grenade launchers and the like, which are provided with a rifled chamber and a firing pin to fire the munition, but which are absent of means to program a smart munition within the chamber. Such firearms may be modified post-manufacture following the techniques described above with a haptic aim-assist capability, and to embed smart munition programming instructions within the haptic aim-assist capability. They may also be implemented in guns or gun-like device configured for intercepting unmanned aerial vehicles (UAVs), or drones.

According to an aspect of this disclosure, a method is provided for programming smart munition by embedding the munition programming data within a haptic feedback signal, e.g. as described above. The transmission of the programming data may be performed by encoding the desired message, e.g. a five-digit timestamp representing milliseconds-until-discharge by way of example, within a haptic feedback aim assist signal. The haptic signal may be, e.g., one of a series of pulses sequenced across a plurality of haptic motors haptically indicating to the user an aim direction or other commands. For example, in an embodiment where two or more HAs are vertically spread and are in a vibrational contact with both the user's hand holding the gun and the smart munition loaded into the gun, exciting the HAs sequentially in an upward direction with a series of pulses may indicate that the user should point their weapon upwards. The data to be transmitted to the smart munition may be encoded in these signals such that it is unnoticeable to the user. As each of these HAs vibrate in varying intensity and/or frequency, the vibrations may be detected by vibration sensor(s) within the gun, and the information encoded therein may be decoded by a processor (controller) provided within the smart munition or communicatively coupled thereto. In some embodiments, the information may be decoded from an interference pattern of vibrations induced by the HAs at a location or locations of the vibration sensor(s). In some embodiments, one or more HAs mechanically coupled to a gun or embedded therein may be used for programming smart munition within the gun without providing haptic feedback to the user holding the gun.

Example embodiments described above are not intended to be limiting, and many variations will become apparent to a skilled reader having the benefit of the present disclosure. For example, in some embodiments one or more vibration motors embedded in a gun or in a mechanical contact with a gun, e.g. in a clip-on or another attachment that may be at least temporarily affixed to the gun, may be used to transmit munition programming information to a smart munition within the gun without providing a haptic feedback to the user holding the gun; in such embodiments, the vibration motors do not need to be in a haptic contact with the user holding the gun. Furthermore, some embodiments may lack an orientation sensor, e.g. when operating with an external controller capable of detecting a gun orientation, or when no aim control signal is provided. Furthermore, various features described above with reference to a specific embodiment or embodiments may be combined with other embodiments.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

The invention claimed is:

1. An apparatus for programming a munition loaded in a gun, the apparatus comprising:
 a body configured for being mechanically coupled to the gun and for being in a haptic contact with a user of the gun;
 one or more haptic actuators (HAs) mechanically coupled to the body for generating vibrations to provide a haptic signal to the user holding the gun; and,
 a haptic controller configured to cause the one or more HAs to modulate the vibrations with a munition programming signal comprising munition programming information destined to the munition in the gun, to test a vibration response of the gun coupled to the body to detect mechanical resonance thereof, and to spectrally adjust the vibrations away from the detected mechanical resonances.

2. An apparatus for programming a munition loaded in a gun, the apparatus comprising:
 a body configured for being mechanically coupled to the gun and for being in a haptic contact with a user of the gun;
 one or more haptic actuators (HAs) mechanically coupled to the body for generating vibrations to provide a haptic signal to the user holding the gun; and,
 a haptic controller configured to cause the one or more HAs to modulate the vibrations with a munition programming signal comprising munition programming information destined to the munition in the gun, wherein the one or more HAs comprises first and second HAs, and wherein the controller is configured to cause the first HA and the second HAs to vibrate at a first vibration frequency f1 and at a second vibration frequency f2, respectively, wherein f1/f2, wherein the haptic controller is configured to test a vibration response of the gun coupled to the body to determine mechanical resonance thereof, and to adjust at least one of the first and second vibration frequencies responsive to the vibration response.

3. The apparatus of claim 2 wherein the haptic controller is further configured to modulate one of the first and second HAs with the munition programming signal having a spectral bandwidth $\Delta F$, and wherein a difference vibration frequency $\Delta f = |f1 - f2|$ exceeds $\Delta F$.

4. The apparatus of claim 1 wherein the haptic controller is configured to communicate with an external controller to receive the munition programming information therefrom.

5. The apparatus of claim 1 wherein the one or more HAs comprises a plurality of HAs spread along a pre-determined axis, and wherein the haptic controller is configured to selectively activate the HAs in an order or a spatial pattern configured to haptically communicate to the user a direction to a target.

6. A method for programming a munition loaded in a gun, the method comprising:
  mechanically coupling a body to the gun to be in a haptic contact with a user holding the gun, the body comprising a haptic controller and one or more haptic actuators (HAs) configured for generating vibrations to provide a haptic signal to the user of the gun; and, causing, with the haptic controller, the one or more HAs to modulate the vibrations with a munition programming signal comprising munition programming information, where in the method is adapted to use with the munition comprising a vibration sensor and a munition controller coupled thereto, wherein the one or more HAs comprise first and second HAs, the method comprising:
  causing the first HA and the second HA to simultaneously vibrate at a first vibration frequency f1 and a second vibration frequency f2, respectively;
  using the vibration sensor to detect munition vibrations at a difference frequency $\Delta f=|f1-f2|$, or at a harmonic thereof; and
  de-modulating the munition programming signal from the detected vibrations.

7. The apparatus of claim 2 wherein the haptic controller is configured to communicate with an external controller to receive the munition programming information therefrom.

8. The apparatus of claim 2 wherein the one or more HAs comprises a plurality of HAs spread along a pre-determined axis, and wherein the haptic controller is configured to selectively activate the HAs in an order or a spatial pattern configured to haptically communicate to the user a direction to a target.

9. The apparatus of claim 3 wherein the haptic controller is configured to communicate with an external controller to receive the munition programming information therefrom.

10. The apparatus of claim 3 wherein the one or more HAs comprises a plurality of HAs spread along a pre-determined axis, and wherein the haptic controller is configured to selectively activate the HAs in an order or a spatial pattern configured to haptically communicate to the user a direction to a target.

11. The method of claim 6 comprising the haptic controller communicating with an external controller to receive the munition programming information therefrom.

12. The apparatus of claim 4 wherein the one or more HAs comprises a plurality of HAs spread along a pre-determined axis, and wherein the haptic controller is configured to selectively activate the HAs in an order or a spatial pattern configured to haptically communicate to the user a direction to a target.

* * * * *